United States Patent [19]

Schulz

[11] Patent Number: 5,711,768
[45] Date of Patent: Jan. 27, 1998

[54] SEWAGE SLUDGE DISPOSAL PROCESS AND PRODUCT

[75] Inventor: Helmut W. Schulz, Harrison, N.Y.

[73] Assignee: Dynecology, Inc., Harrison, N.Y.

[21] Appl. No.: 410,392

[22] Filed: Mar. 27, 1995

Related U.S. Application Data

[63] Continuation-in-part of Ser. No. 242,532, May 13, 1994, Pat. No. 5,431,702, which is a continuation-in-part of Ser. No. 37,086, filed as PCT/US93/00472, Jan. 19, 1993, abandoned.

[30] Foreign Application Priority Data

Jan. 19, 1993 [WO] WIPO ............... PCT/US93/00472

[51] Int. Cl.$^6$ ............... C10L 5/14; C10L 5/46
[52] U.S. Cl. ............... 44/552; 414/577; 414/578; 414/580
[58] Field of Search ............... 44/552, 577, 578, 44/580, 590, 596, 597

[56] References Cited

U.S. PATENT DOCUMENTS

| | | | |
|---|---|---|---|
| 3,506,414 | 4/1970 | Skendrovic | 44/589 |
| 3,830,636 | 8/1974 | Marsh | 44/589 |
| 3,910,775 | 10/1975 | Jackman | 44/589 |
| 4,049,391 | 9/1977 | Marsh | 44/589 |
| 4,152,119 | 5/1979 | Schulz | 44/589 |
| 4,230,459 | 10/1980 | Moreau et al. | 44/578 |
| 4,405,332 | 9/1983 | Rodrguez et al. | 44/605 |
| 4,552,666 | 11/1985 | Müller | 44/589 |
| 4,615,711 | 10/1986 | Müller | 44/589 |
| 5,125,931 | 6/1992 | Schulz | 44/552 |
| 5,431,702 | 7/1995 | Schulz | 44/452 |

*Primary Examiner*—Margaret Medley
*Attorney, Agent, or Firm*—Thomas H. Whaley

[57] ABSTRACT

Briquettes useful as fuel are produced from dehydrated sewage sludge containing 65 weight percent or more sewage sludge solids. The briquettes on a dry basis contain from about 50 to about 95 weight percent sewage sludge solids together with from about 3 to about 12 weight percent lime as binder and fungistat. Organic binders and coking agents may be included in the briquettes to improve resistance to breakage and to impart high crush strength at elevated temperatures encountered in gasifiers.

2 Claims, 1 Drawing Sheet

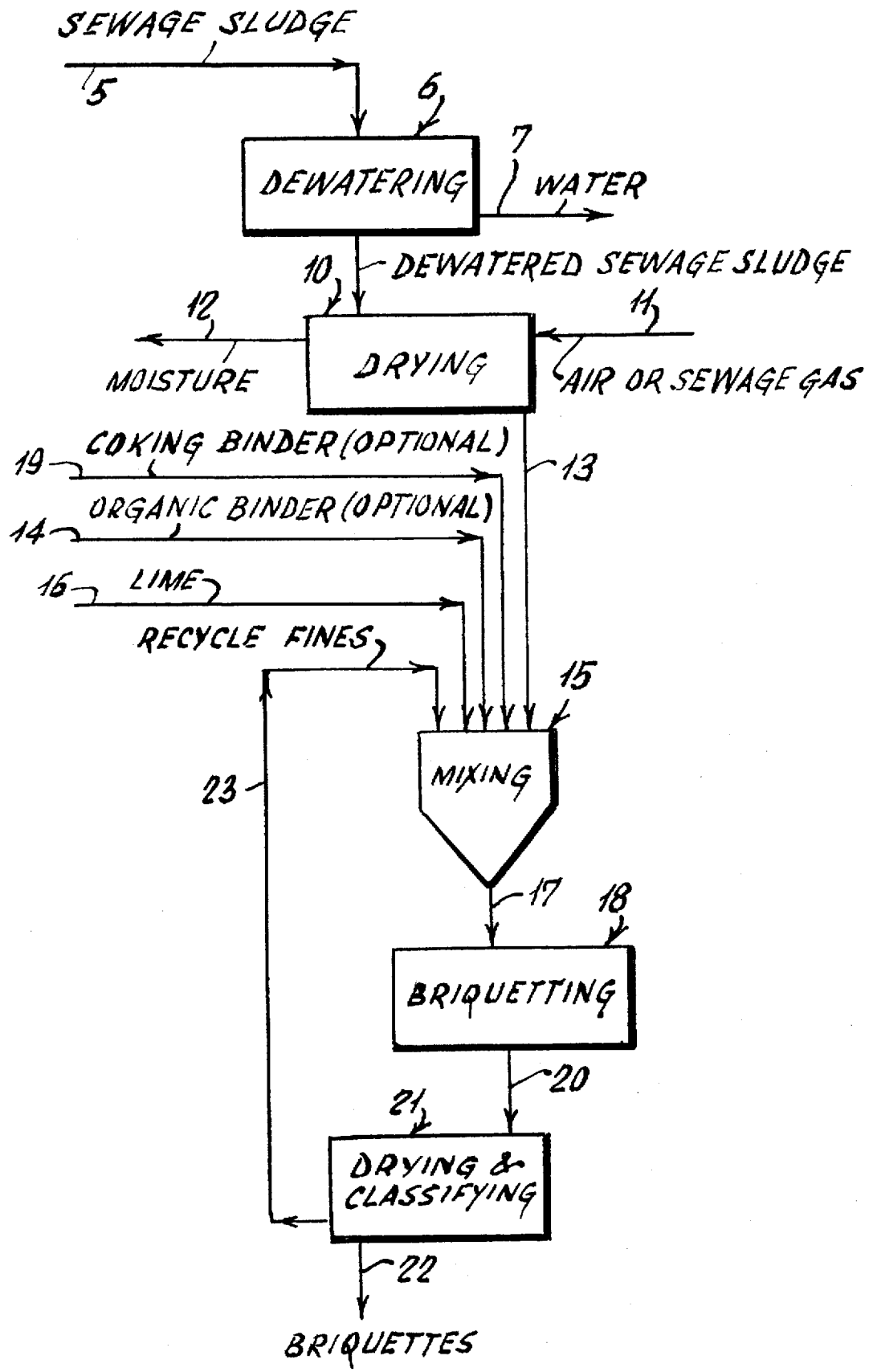

SEWAGE SLUDGE DISPOSAL PROCESS AND PRODUCT

This application is a continuation-in-part of my patent application Ser. No. 08/242,532, filed May 13, 1994, now U.S. Pat. No. 5,431,702, which is a continuation in part application No. 037,086, filed as PCT/US93/00472 Jan. 19, 1993, abandoned.

This invention relates to a process for conversion of municipal sanitary sewage sludge solids into a commercially useful fuel composition and to the products so formed. In one of its more specific aspects, this invention relates to a process for producing an agglomerate in the form of a press molded briquette, or extruded solid pellet comprised principally of sewage sludge solids (SSS) and lime, and to its resultant products. In another of its more specific aspects, briquettes are formed which also contain an organic binder and/or a carbonaceous coking agent which serves as a high temperature binder when the briquettes or pellets are heated to a coking temperature, e.g. 1000° F. or more. Fuel briquettes suitable as fuel for use in a moving bed gasifier may be produced from dry or partially dried sewage sludge solids. The resulting briquettes may contain from about 50 to about 95 weight percent sewage sludge solids.

BACKGROUND OF THE INVENTION

The problems of disposal of municipal sewage sludge continue to grow in spite of a number of methods employed for or proposed for its disposal. Ocean dumping has been banned under Federal law. Alternative methods of disposal include dewatering the sewage sludge by the use of filters or centrifuges and dumping the dewatered sewage sludge in land fill areas. Meanwhile, metropolitan areas are rapidly running out of available land fill sites.

The use of undewatered sewage sludge as fuel has been proposed in U.S. Pat. No. 4,405,332 to Rodriguez et al in which sewage sludge is mixed with pulverized solid fuel, e.g., coal, to form a pumpable mixture. Only very small percentages of sewage sludge solids may be disposed of by this method. Rodriguez et al discloses a pumpable liquid fuel composition comprising 60 to 75 percent by weight solid fuel, e.g. coal, and from 25 to 40 weight percent undewatered sewage sludge consisting of 85 to 99.5 weight percent water.

U.S. Pat. No. 4,615,711 to Müller discloses fuel briquettes containing from 0.3 to 0.6 parts sewage sludge solids per part autumn foliage, and from 0.6 to 1.0 part sewage sludge solids per part solid residue resulting from solvent extraction of autumn foliage, i.e. tree leaves.

U.S. Pat. No. 3,910,775 to Jackman discloses a process for treatment of garbage or refuse, coal fines, and raw sewage to form fuel briquettes containing undisclosed amounts of the garbage and sewage sludge components, which presumably are in the ratio normally occurring in municipal wastes.

My U.S. Pat. Nos. 4,152,119 and 4,225,457 disclose a process for producing briquettes suitable as fuel for a moving bed gasifier from municipal solid wastes and crushed caking coal. Dewatered sewage sludge is disclosed as a suitable binder for solids at a binder concentration in the range of 2 to 6 percent by weight.

Incineration of sewage sludge solids has been proposed, but is not an attractive method of disposal due to the water content of moist Centrifuged sludges or filter cake solids, which typically contain 65 to 75 weight percent water after concentration by conventional filtering or centrifuging methods.

Among the various processes for disposal of sewage sludge are those which involve gasification of the sludge by partial oxidation with air or oxygen to produce useful industrial and fuel gases. In my co-pending U.S. Pat. No. 5,481,702, dewatered sewage sludge containing 25 to 50 weight percent solids (50 to 75 percent water) is mixed with 1.5 to 5 parts by weight waste paper or refuse derived fuel per part sewage sludge solids and this mixture molded under pressure into briquettes or extruded to form pellets. Optionally these briquettes or pellets may be pulverized, mixed with water and with 1 to 3 parts by weight crushed coal, and the resulting mixture, which contains up to 10 weight percent sewage sludge solids, pressed into briquettes suitable for use as fuel in a moving bed type gasifier, e.g. a Lurgi gasifier.

In the earlier processes for the production of briquettes containing sewage sludge solids, the sewage sludge is present in amounts of from less than 1 percent to almost 20 weight percent sewage sludge solids. Cellulosic solids, including paper waste and municipal solids waste, are employed to provide sufficient structural strength to the briquettes to withstand normal handling. Caking coal also may be added to provide sufficient structural strength to withstand crushing forces due to the weight of the burden when the briquettes are used as fuel in a large moving bed gasifier.

BRIEF DESCRIPTION OF THE INVENTION

I have now discovered that high structural briquettes having a high sewage sludge solids content can be made from dry or partially dried sewage sludge. The fuel briquettes of this invention contain 50 weight percent or more sewage sludge solids and may be formulated to possess the strength necessary to support the burden in a moving bed gasifier without undue crushing of the briquettes.

In accordance with a preferred embodiment of my invention, in the preparation of fuel briquettes containing 50 weight percent or more sewage sludge solids, two distinct types of binders are employed. A water soluble or hydrophilic organic binder, for example molasses, is mixed with the sewage sludge solids in an amount necessary to impart sufficient green strength to the pressed or extruded pellets to permit them to withstand normal handling without undue breakage. In general, the amount of water soluble or hydrophilic organic binder required depends on its solids content. Binder solids in the product in the range of 5 to 8 weight percent on the basis of sewage sludge solids content are preferred. At the same time, from about 25 to about 50 weight percent carbonaceous coking agent, e.g. solid bitumen or pitch, or petroleum residuum in particle form, basis the weight of the sewage sludge solids, is added to the sewage sludge solids/organic binder mixture to form a high temperature binder and provide high crush strength to the briquettes when heated to coking temperature in a gasifier. In accordance with this embodiment, a mixture of dry or partially dried sewage sludge solids, lime, organic binder, and bitumen or pitch, having a moisture content in the range of from about 12 to about 22 weight percent is formed into briquettes or pellets by mechanical compression at a pressure in the range of from about 1,000 to about 10,000 pounds per square inch, preferably at a pressure in the range of from about 3,000 to about 5,000 psi. The resulting briquettes or pellets are suitable for use as fuel, in a moving bed gasifier.

In another preferred embodiment of my invention, sewage sludge solids which have been dried to a moisture content in the range of from about 0 to about 25 weight percent moisture (75 to 100 weight percent sewage sludge solids) are mixed with lime and optionally a hydrophilic or water soluble organic binder to form a composition having a moisture content in the range of from about 12 to about 22 weight percent and the composition compressed into briquettes or pellets at a pressure in the range of from about 1,000 to about 10,000 pounds per square inch, preferably at a pressure in the range of from about 3,000 to about 5,000 pounds per square inch. The resulting briquettes are suitable for use as fuel in conventional furnaces designed to burn particulate fuels. The briquettes or pellets may be further dried in ambient air or in heated air or flue gas if desired. If desired, these briquettes or pellets may be comminuted, mixed with a coking agent, e.g., caking coal, pitch or bitumen, or petroleum residuum, and with water and/or aqueous hydrophilic or water soluble binder sufficient to provide a moisture content in the mixture in the range of from about 12 to about 22 weight percent and pressed into briquettes or pellets at a pressure in the range of from about 1,000 to about 10,000 psi, preferably 3,000 to 5,000 psi. The coking agent imparts sufficient high temperature crush strength to the briquettes or pellets to permit their use as fuel in a moving bed gasifier. Pellets produced without a coking agent, i.e. from sewage sludge solids, lime, and water soluble or hydrophilic organic binder only are preferred when the sewage sludge solids are to be shipped some distance from the municipal sewage sludge source to the consumption site. For example, sewage sludge solids from the Eastern seaboard may be pelleted and shipped to the Appalachian area for conversion to coal-containing briquettes or pellets. The coal-containing briquettes or pellets may be gasified to produce fuel gas or synthesis gas, heat and power at the conversion site or shipped to other areas for such purposes.

BRIEF DESCRIPTION OF THE DRAWINGS

The figure is a flow diagram illustrating a preferred procedure for carrying out the process of this invention.

DETAILED DESCRIPTION OF THE INVENTION

With reference to the drawing, sewage sludge from an available source, for example, sludge from a municipal sanitary sewage treatment plant, is supplied from line 5 to a dewatering operation 6. Sewage sludge from such plants which are suitable for use in the process of this invention may be in the form of primary (undigested) sludge, sludge-activated sludge, digested sludge, or a combination of the various sludges typically produced at a sewage treatment facilities. In accordance with this invention, sewage sludge supplied through line 5 is dewatered mechanically by means of a centrifuge, vacuum filter, filter press or screw press or combination thereof in a dewatering step 6 yielding dewatered sewage sludge (DSS), usually referred to as a DSS cake, containing from 20 to 40 weight percent sewage sludge solids (60 to 80 weight percent water). Water removed from the sewage sludge dewatering step 6 is discarded through line 7.

The resultant dewatered sewage sludge cake is passed through line 8 to dryer 10 wherein it is dried to a solids content of 65 weight percent or higher. The dryer suitably is in the form of a rotary kiln or steam-heated dryer of a type known in the art. As illustrated in the figure, air or flue gas is supplied to the dryer through line 11 and moisture-laden air or flue gas discharged from the dryer through line 12.

The partially dried sewage sludge solids (SSS) leave the dryer through line 13 from which they are supplied to mixer 15 where they are thoroughly blended with a hydrophilic or water soluble organic binder material from line 14. If desired, crushed or pulverized solid coking agent may be supplied from line 19. Lime is supplied through line 16. The resultant mixture containing from about 12 to about 22 weight percent water is passed through line 17 to a briquetting facility 18 where briquettes or pellets are formed by an extrusion device or a briquette press at a pressing pressure in the range of 1,000 to 10,000 psi, preferably in the range of 3,000 to 5,000 psi. The pellets or briquettes leave the briquetting facility through line 20. To assure uniformity of product size, the pellets or briquettes may be screened and/or dried in a screening and drying operation designated generally by the numeral 21. The product briquettes exit the process through line 22. Broken pieces and fines generated in the process are returned to the mixing step 15 through line 23.

The moisture content of the feed mixture supplied through line 17 to the briquetting step 18 from the mixing step 15 is an important factor affecting not only the operation of the briquetting machines but also the strength of the ensuing briquettes or pellets, hereinafter referred to as the "green strength" of these products. A moisture content of the feed mixture in the range of 12 to 22 weight percent produces pellets and briquettes having sufficient green strength to withstand normal handling with only nominal breakage. The optimum moisture content of the feed mixture depends to some extent upon the characteristics of the particular feed materials employed, the relative proportion of each material in the feed mixture, and upon the compaction method. Pellet extrusion requires a higher moisture content (up to 22 percent) in the feed mixture in order to prevent charring of the sewage sludge solids during extrusion. For typical sewage sludge solid mixtures formed into briquettes using a rotary press, the moisture content of the briquette forming composition supplied to the briquetting press is preferably in the range of from about 14 to about 19 weight percent. Preferably briquettes are formed by pressing the feed composition in a rotary briquetting press of the type available from Bepex Corporation, Minneapolis, Minn. wherein the briquettes are formed under a pressure above about 1000 psi, suitably in the range of 3000 to 5000 psi. Briquettes leaving the press are steaming hot from the energy expended in their formation under pressure. The freshly pressed briquettes may be further dried before use as fuel, primarily to permit the green briquettes to develop increased mechanical strength. Briquettes having a moisture content in the range of from about 10 to about 12 weight percent have excellent green strength.

The product briquettes or pellets obtained by the process of this invention without the coking component comprise at least 80 weight percent sewage sludge solids (dry basis).

Sufficient carbonaceous coking agent as binders to impart high temperature crush strength to the pellets or briquettes is included whenever the pellets or briquettes are to be used in fixed bed or moving bed gasifiers. In general, the carbonaceous coking binders, when added, are present in the dry pellet or briquette at a concentration in the range of from about 25 to about 100 weight percent, basis the weight of the sewage sludge solids, i.e., in a ratio of 1:4 to 1:1.

Water soluble or hydrophilic organic binders may be selected from the list including black liquor from the paper industry, black strap molasses, starch, brewery waste, residual syrup from the refining of sugar beets, polysaccharides, lignin sulfonates, and the like. The concentration of organic binder additive required may be determined by trial for any given binder and source of sewage sludge. The amount of binder employed may range from 0 to 6 to 8 weight percent and is preferably the minimum concentration that will endow the briquette or pellet with adequate physical strength to avoid crushing during normal handling procedures. All of the above-mentioned binders are suitable for the production of briquettes or pellets by the process disclosed herein with sufficient green strength to permit handling, transporting and utilization of the pellets as fuel in conventional furnaces. When the briquettes or pellets are to be used as fuel in a fixed or moving bed gasifier where high temperatures occur in the burden passing through the pyrolysis and coking zones, coking binders are included in their composition. Coking binders include caking coal and normally solid pitch or bitumen, suitably from petroleum refinery residues, which form coke in the pyrolysis and coking sections of a gasifier. Such pellets or briquettes gravitate without substantial loss of structural strength or excessive deformation through the moving bed to the hearth section of the gasifier where they are gasified with air or oxygen and steam in known manner as described more particularly in my U.S. No. 4,225,173.

In order to endow the "green" briquettes or pellets (i.e., as these issue from the compactor) with anti-fungal stability during transport and storage, from about 3 to about 12 weight percent lime is included in the formulation. The lime acts as a bonding agent and serves as a fluxing agent when the pellets are consumed in a slagging gasifier.

The agglomerates, in the form of pellets or briquettes, including extruded cylinders, or pressed forms, may be employed as furnace fuel or as a gasifier feedstock, either as such, or in admixture with a non-caking combustible solid, for example, lump coal of controlled size, petroleum coke, wood char, or "Simplex" briquettes (comprised of refuse derived fuel and a caking coal as more particularly described in my U.S. Pat. No. 4,152,119). Employing a feedstock comprised primarily of sewage sludge solids in the form of pellets or briquettes is advantageous from the standpoint of maximizing the tipping fee income that normally attends the disposal of sewage sludge in an environmentally benign manner. An admixture with coal or petroleum coke, on the other hand, will enhance the energy yield in the form of a clean synthesis or fuel gas. The latter is a desirable fuel for advanced gas turbines of an IGCC (integrated gasification, combined cycle) power plant. This mode of operation is preferred for municipalities or principalities that command a relatively modest supply of sewage sludge solids. The co-processing of a non-caking coal, petroleum coke, or Simplex briquettes leads to economies of scale in the gasification and power generating components of the plant.

The feedstock described above may be processed in a variety of gasifiers, including especially the following: an oxygen-blown, high-pressure slagging gasifier (of the British Gas/Lurgi type), an oxygen-blown, high pressure dry-bottom gasifier (of the Lurgi type), an air-blown low-pressure, dry-bottom gasifier (of the Wellman Galusha type), and a fluid bed gasifier (of the Winkler type). The use of a slagging gasifier, for example, as disclosed in U.S. Pat. No. 4,840,897) is recommended when processing sewage sludges from industrialized metropolitan centers (such as Newark, N.J.) where the sludge is likely to be contaminated with unacceptable concentrations of toxic heavy metals. In a slagging gasifier of the type recommended, the toxic heavy metals are encapsulated in a glassy frit, which has been shown to be non-leachable by accepted EPA standards. By the same token, dry-bottom gasifiers may be operated at a sufficiently high temperature to effect partial sintering of the ash. This mode of operation reduces the leachability of the resultant ash. Similarly, the inclusion of coal, bitumen or pitch as a coking agent may serve to reduce the concentration of heavy metals in the resultant ash or slag.

The product gas passes through a standard gas clean-up train to remove acid gases and other air pollutants. Hydrogen sulfide may be recovered by one of several commercially available processes and converted to elemental sulfur in a Claus unit. These procedures are state-of-the-art, and need not be further described here, as they are not part of this invention.

This invention may be considered an improvement over the invention disclosed in my U.S. Pat. No. 5,125,931. This invention affords the important advantage of being freed from necessity of incorporating a caking coal in the briquette or pellet formulation. Many municipalities would consider it an extra operational burden to import and process coal as part of the sewage sludge disposal process. Also, in an integrated co-generation system, the entire installation, including a briquetting plant, a gasifier, a gas clean-up train, gas turbine, and electric generator, can be of proportionately smaller scale.

The non-caking character of sewage sludge pellets or briquettes makes it possible to co-press these materials with caking or non-caking coals where such gasification facilities are already in place, and where the sewage sludge solid pellets or briquettes simply displace a portion of the coal feed.

EXAMPLE

Compositions of briquettes which may be produced in accordance with this invention may vary somewhat depending upon variables inherent in sewage sludges and in water soluble organic binders, e.g. molasses, and hydrophilic organic binders, e.g. food starch. Representative suitable components and product compositions are illustrated the following examples (Tables I and II).

Suitable formulations for any given combination of components may be determined by preparing test briquettes using a two part die and a hydraulic press. Green test specimens are dried and subjected to handling, such as by tumbling in a rock tumbler. Test specimens containing a coking agent are evaluated for crush strength by heating them to 1000° F. in a ceramic furnace followed by cooling and pressing the briquettes between flat plates.

In the following Examples 1–3, 7, and 8, a commercially available anhydrous lignin sulfonate containing 5 percent moisture as received, and marketed under the trade name Norlig, is employed as the water soluble organic binder. In Example 4, the water soluble organic binder is molasses; in Examples 5 and 9, the water soluble organic binder is black liquor from the paper industry; and in Example 6, only lime and water are used as binders.

In Examples 1–6 (Table I), the briquettes are formed without an added coking agent. In Examples 7–9, sewage sludge briquettes suitable for use in a fixed or moving bed gasifier are produced with pyrolized pitch from petroleum refinery residue as coking binder. All briquettes contain high concentrations of sewage sludge solids.

TABLE I

| Component (parts by weight) | Example | | | | | |
|---|---|---|---|---|---|---|
| | 1 | 2 | 3 | 4 | 5 | 6 |
| Concentrated Sludge | 100 | 100 | 100 | 100 | 100 | 100 |
| Sewage Sludge Solids | 76 | 80 | 85 | 80 | 85 | 100 |
| Water | 24 | 20 | 15 | 20 | 15 | 0 |
| Lime | 4.6 | 4.8 | 5.1 | 4.8 | 5 | 8 |
| Organic Binder | 5.6 | 6.0 | 6.3 | 9.8 | 12 | — |
| Solids | 5.3 | 5.7 | 6.0 | 6.4 | 6 | — |
| Water | 0.3 | 0.3 | 0.3 | 3.4 | 6 | 16 |
| Total | 110.2 | 110.8 | 111.4 | 114.6 | 117 | 124 |
| Total Solids | 86.2 | 90.5 | 96.1 | 91.2 | 96 | 108 |
| Total Water | 24.3 | 20.3 | 15.3 | 23.4 | 21 | 16 |
| Wt. % Moisture | 22 | 18.4 | 13.7 | 20.4 | 18 | 12.9 |
| Briquette Composition (wt. % dry basis) | | | | | | |
| Sewage Sludge Solids | 88.5 | 88.4 | 88.4 | 87.7 | 88.5 | 92.6 |
| Lime | 5.4 | 5.3 | 5.3 | 5.3 | 5.2 | 7.4 |
| Binder Solids | 6.2 | 6.3 | 6.2 | 7.0 | 6.3 | — |

TABLE II

| Component (parts by weight) | Example | | |
|---|---|---|---|
| | 7 | 8 | 9 |
| Concentrated Sludge | 100 | 100 | 100 |
| Sewage Sludge Solids | 80 | 70 | 75 |
| Water | 20 | 30 | 25 |
| Lime | 6 | 5 | 5 |
| Organic Binder | 6 | 5 | 9 |
| Solids | 5.7 | 4.75 | 4.5 |
| Water | 0.3 | 0.25 | 4.5 |
| Coking Binder Pitch | 20 | 35 | 35 |
| Total | 132 | 144.5 | 149 |
| Solids | 111.7 | 114.8 | 119.5 |
| Water | 20.3 | 30.2 | 29.5 |
| Wt. % Moisture | 15 | 21 | 19.8 |
| Briquette Composition (wt. % dry basis) | | | |
| Sewage Sludge Solids | 71.6 | 61 | 62.7 |
| Lime | 5.4 | 4.4 | 4.2 |
| Organic Binder Solids | 5.1 | 4.1 | 3.8 |
| Coking Binder | 17.9 | 30.5 | 29.3 |

I claim:

1. Molded or extruded briquettes or pellets consisting essentially of on a dry basis from about 70 to about 95 weight percent sewage sludge solids, and from about 3 to about 12 weight percent lime formed by molding or extruding into briquettes or pellets at a pressure in the range of from about 3,000 to about 5,000 psi a mixture of at least partially dried sewage sludge solids and lime, said mixture containing from about 12 to about 22 weight percent moisture.

2. Briquettes or pellets according to claim 1 further including an organic binder wherein the organic binder is selected from the group consisting of blackstrap molasses, residual syrup from the refining of sugar from sugar beets, black liquor from the paper industry, lignin sulfonates, brewery wastes, polysaccharides, and starch.

* * * * *